April 6, 1954

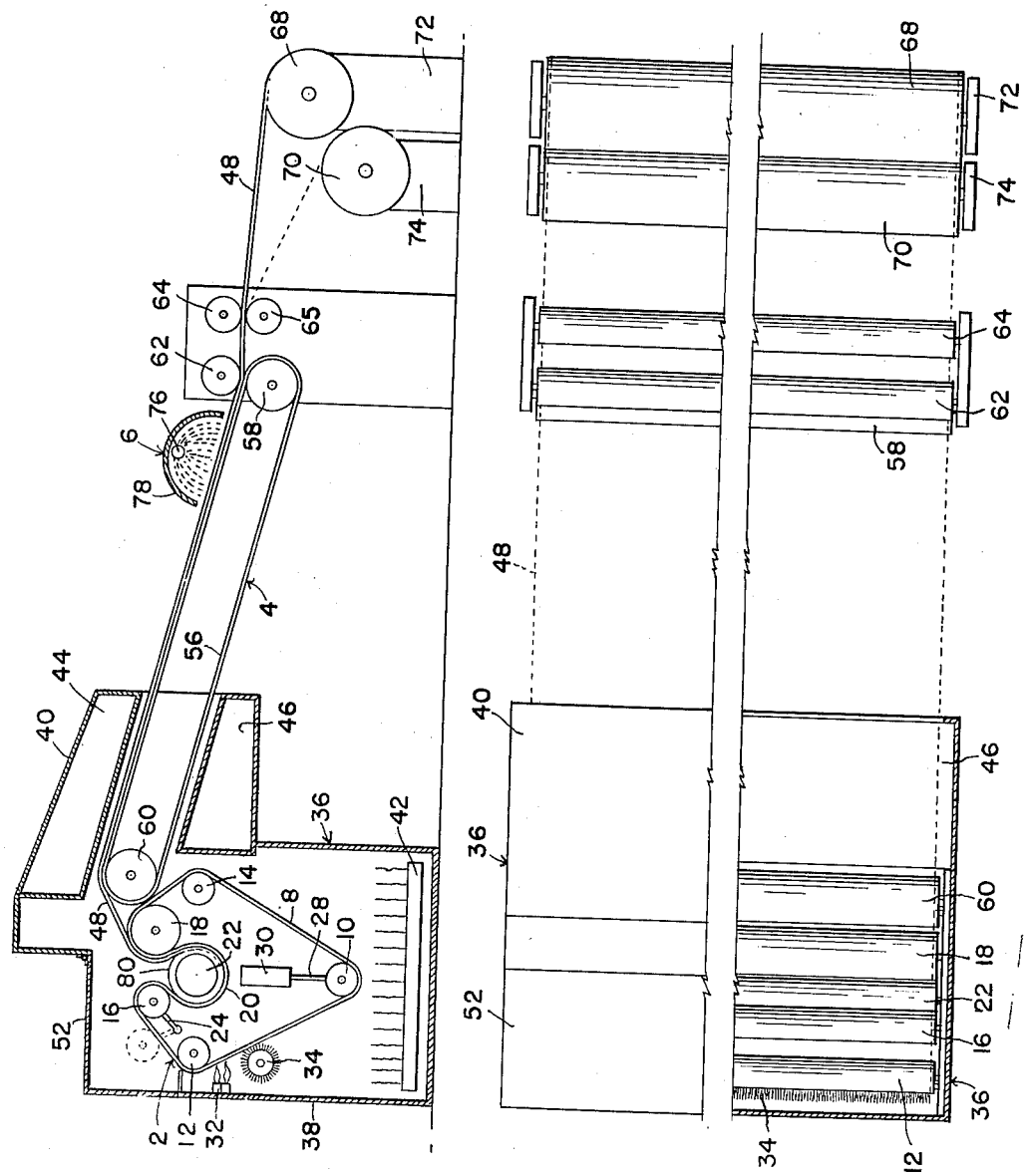

H. D. BOGGS 2,674,557

PROCESS OF MAKING NONMETALLIC PIPE

Filed March 11, 1949

Inventor
HERBERT D. BOGGS

Cushman, Darby + Cushman
Attorneys

April 6, 1954 H. D. BOGGS 2,674,557
PROCESS OF MAKING NONMETALLIC PIPE
Filed March 11, 1949 3 Sheets-Sheet 3
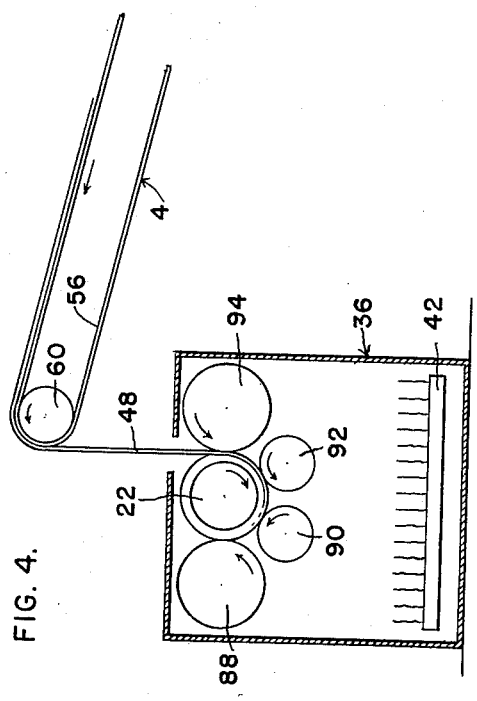
FIG. 4.
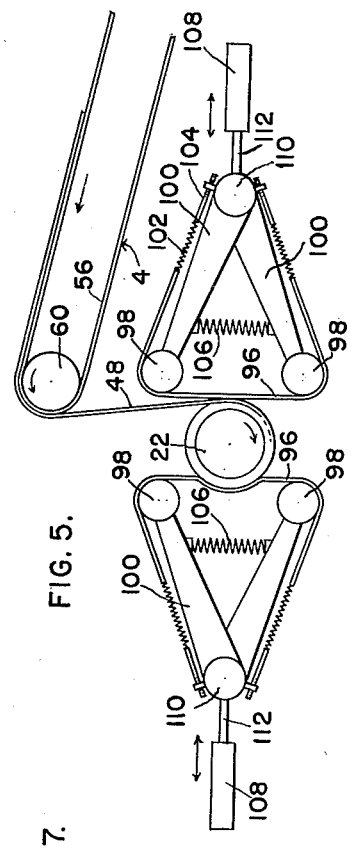
FIG. 5.
FIG. 7.
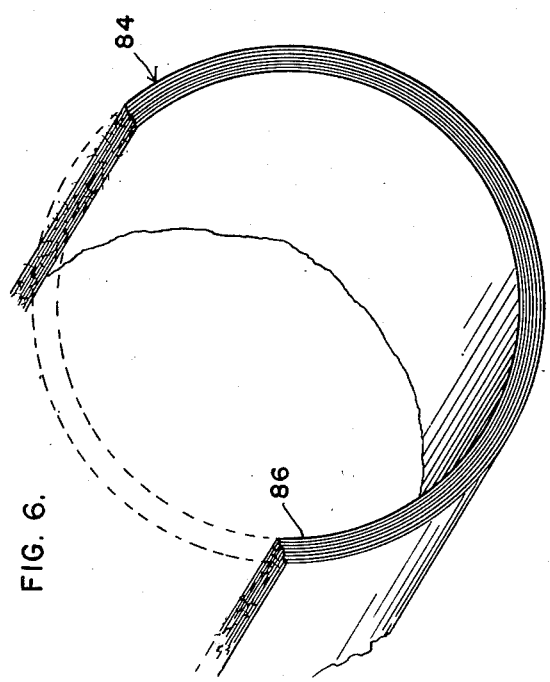
FIG. 6.
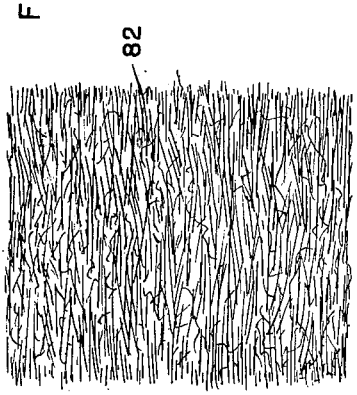
Inventor
HERBERT D. BOGGS
Cushman, Darby & Cushman
Attorneys Patented Apr. 6, 1954

2,674,557

UNITED STATES PATENT OFFICE 2,674,557

PROCESS OF MAKING NONMETALLIC PIPE

Herbert D. Boggs, Birmingham, Ala., assignor to H. D. Boggs Company, Ltd., Omaha, Nebr., a limited partnership Application March 11, 1949, Serial No. 80,972

9 Claims. (Cl. 154—83)

This invention relates to a new process for the production of tubular members made from plastic bonded laminations of fibrous material and to the tubular members made by the process.

More particularly, the invention concerns the production of non-metallic pipe by a special procedure for laminating fibrous material, such as glass fibre mats together with plastic bonding material.

FIELD OF INVENTION

Because ordinary steel or iron pipe does not possess the required corrosion resistance or possesses too great a weight for many types of applications, and also because such pipe is relatively expensive in large sizes, numerous attempts have been made to form pipes from substitute materials which will be more corrosion resistant, lighter in weight and, at the same time, competitive from the standpoint of cost. Various materials have been used for this purpose among which are the so-called plastic materials. Pipe has been made from plastic substances by such procedures as extrusion, casting, or the like. However, cast or extruded pipe which contains no incompatible reinforcing material is unsatisfactory for any applications which require pipe that can withstand substantial internal pressures.

A relatively satisfactory type of pipe has been prepared in the past from layers of fibrous webs, such as cotton duck fabric or fibre glass cloth, which have previously been impregnated with some variety of material which can polymerize to a solid state. Such pipe is formed by wrapping the sheets into tubular form of sufficient thickness, and then treating the laminated structure so as to cause the polymerization of the impregnating material in order to form the final pipe.

The procedures which have been used in the past for the formation of such laminated pipe have been defective because of several reasons. First, the method of forming the pipe by wrapping the impregnated webs into a proper shape and then subjecting the totally formed structure to polymerization conditions consumes a very large amount of time, i. e., of the order of several hours to several days, in order to bring about the complete polymerization of the bonding material and to form the final structure. Secondly, the pipe or other tubular members produced by such methods exhibits variations in structural strength and characteristics which has been found to be due to the formation of voids between separate layers of the laminated product or due to formation of areas in the members in which the bonding material is not fully polymerized.

Various attempts have been made to modify these known procedures so as to eliminate the defects spoken of above. For example, one approach has been to utilize bonding materials of special variety which are designed to reduce the time required for polymerization and also reduce or eliminate any by-products in the polymerization reaction which may be one cause for the formation of the voids in the pipe. All improvements, however, which have been made to date in this art have still not provided a pipe manufacturing procedure which produces consistently satisfactory pipe at a rate which is rapid enough to provide products which are competitive with metal pipe or tubing of comparable properties.

OBJECTS

A principal object of this invention is the provision of new improvements in the art of making pipe or other tubular members by bonding together a number of layers of a fibrous web with a plastic or resinous substance by wrapping a web of fibrous material impregnated with a resinous substance about a suitably shaped mandrel. Further objects include:

(1) The provision of a new process for the formation of plastic bonded laminated fibre web pipe which makes possible the production of such pipe, even in very large sizes, in a relatively short period of time, i. e., of the order of a few minutes to several hours;

(2) The provision of such pipe which has very high structural strength and other physical properties and in which said structural and physical values are consistent throughout a length of the pipe and in succeeding lengths of pipe.

(3) The provision of new procedures for manufacturing such pipe which substantially completely eliminates the formation of voids or other defective sections in the pipe;

(4) The provision of several alternative procedures or modifications by which the basic novel improvements afforded by the present invention may be utilized in the formation of such pipe;

(5) The provision of new improvements in the manner of handling fibrous webs in forming pipe of the described type.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION OF THE INVENTION

These objects are accomplished according to the present invention by a process which, briefly described, comprises impregnating a web of fibrous material with a liquid composition containing a predominant amount of a resinous condensation product which is capable of polymerizing to an infusible solid, partly curing the thermosetting material with which the web is impregnated while the web is outstretched to produce a tacky surface upon the impregnated web, winding or rolling a section of the partly cured web into a tubular shape, one layer in thickness, then causing the plastic thermosetting material in the wound web to be substantially completely polymerized and then, after the resin in the first layer is polymerized, winding a second layer of partly cured web about the first layer, applying sufficient pressure to hold the second layer in intimate contact with the first layer, polymerizing the resin in the second layer, while the first and second layers are held in contact, and then repeating the cycle of wrapping a partly cured layer on to the substantially completely cured layer and curing the top layer until a structure of the desired thickness has been formed.

The success of the present invention is due to a large extent to the discovery that a large portion of the polymerization of the plastic material with which the fibre webs are impregnated and which is used to bond together the individual layers of the tubular members can be carried a substantial percentage toward completion, while the web is still laid out in a single layer and before it has been wound on the shaping mandrel and that after this processed fibre web can then be wrapped around the mandrel, the polymerization of the impregnated resin material can be completed in the single layer of the shaped web. Surprisingly, it has been found after the single layer of web has been cured, the second and successive layers of partly cured, impregnated webs can be brought in contact with the first completely cured web layer and polymerized in contact therewith, with the formation of a unit having very high structural strength. This seems to be an unusual discovery and contrary to the general prior knowledge which has taught that it is necessary, in order that the resulting structures would not readily delaminate and possess inferior structural properties, to wrap all the layers into the desired shape, where a liquid resinous bonding material is used, while an appreciable percentage of the resin material had yet not been polymerized completely, the general opinion being that intimate contact between the layers, without the polymerization being complete, was necessary to accomplish satisfactory welding of the separate layers.

DETAILED DESCRIPTION

Apparatus

A more complete comprehension of the new procedures provided by this invention and the various steps involved can be had by reference to the accompanying darwings which diagrammatically illustrate apparatus for use in carrying out these procedures. In the drawings:

Figure 1 is a diagrammatic side view of a preferred form of apparatus for use with the procedures of this invention;

Figure 2 is a top view, partly broken away and partly in section, of the apparatus shown in Figure 1;

Figure 4 is a diagrammatic side view in section of the winding mandrel portion of another modified form of apparatus;

Figure 5 is a diagrammatic side sectional view of yet another form of the mandrel winding portion of the apparatus;

Figure 6 is a perspective view partly broken away of a section of pipe made in accordance with this invention;

Figure 7 is a diagrammatic top view of a fibre mat such as can be used in the formation of pipe or other tubular members in accordance with this invention.

Figure 3:
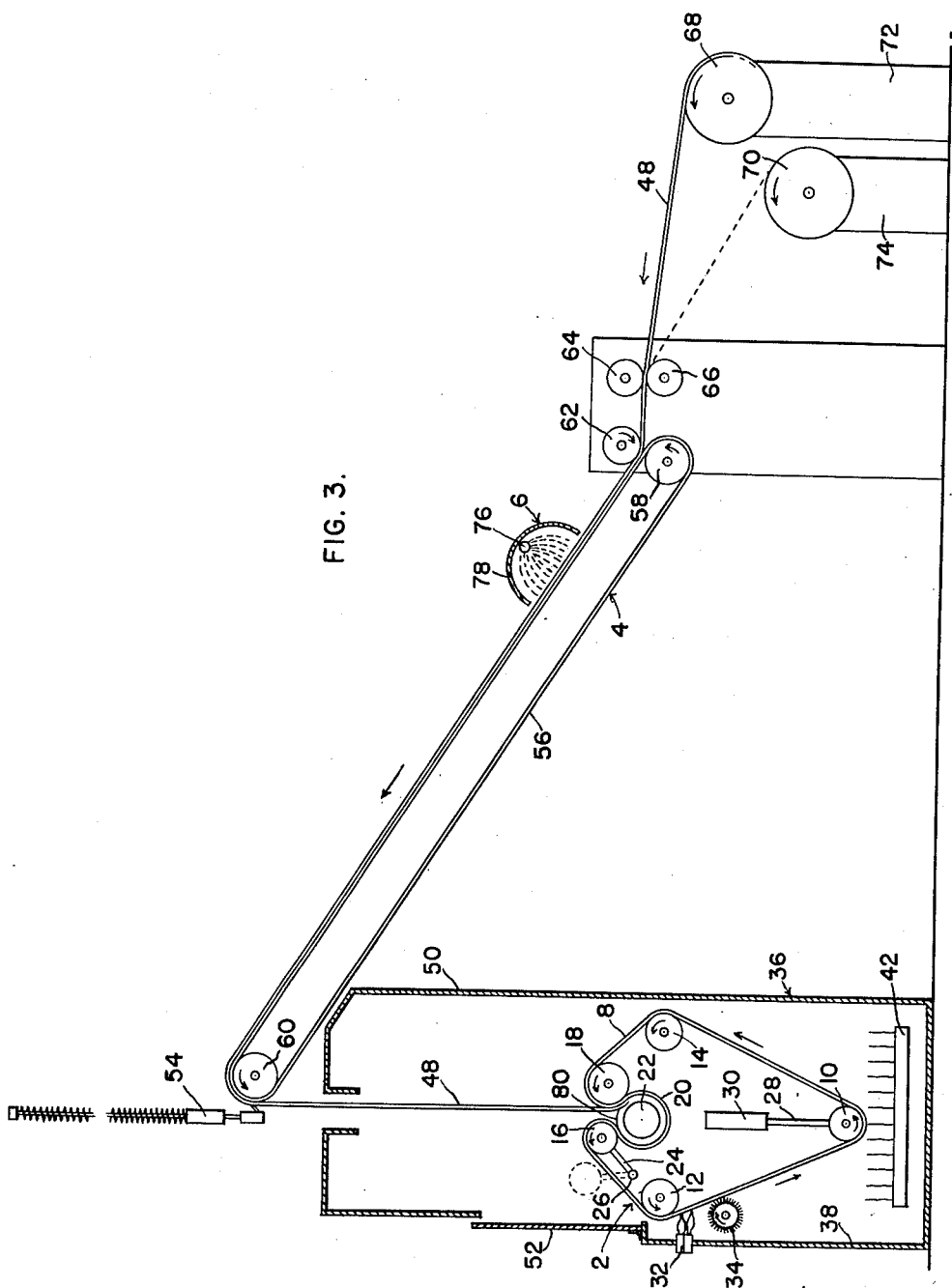
Figure 3 is a diagrammatic side sectional view of a modified form of apparatus for use with this invention.

Referring in detail to the drawings, the basic elements of apparatus for use in my process comprise a winding section 2, a belt conveyor section 4, a spray unit 6 and heating means for applying heat both to the web after impregnation with a resin solution and also when the partially cured web is wound about a forming mandrel.

Considering first the nature of the winding unit 2, in its preferred form shown in Figures 1 and 3, this unit has an endless belt 8 which is carried upon a set of reversing rollers 10, 12, 14, 16 and 18. The two top rollers 16 and 18 in the reversing set are placed close to one another and the belt 8 is of such length that, after the belt is fitted entirely around the path of the rollers, a loop 20 is formed below the top rollers 16 and 18.

The loop 20 in the endless belt 8 forms a cradle for the winding mandrel 22, i. e., the mandrel 22 is merely carried within the loop 20 and movement of this mandrel can be effected by the movement of the belt 8 being driven through rollers 12 and 14, which can be provided at spaced sections with teeth which will engage slotted portions in the belt 8, or mandrel 20 can be directly driven through an integral sprocket and chain unit (not shown).

The roller 16 is movable relative to the other rollers by being rotatably carried upon an arm 24 which can pivot about the point 26. In addition, roller 10 is also movable up and down, since it is carried upon the lower end piston rod 28 which is operated by the hydraulic cylinder 30. When the roller 10 is forced down by the hydraulic pressure in the cylinder 30, it tightens the endless belt 8 around the reversing rollers and applies pressure around the outside of the mandrel 22. Conversely, when the roller 10 is lifted up, the belt 8 slackens so that the roller 16 can be pivoted away from the roller 18 and the mandrel 22, with any pipe which has been formed around it, can be lifted free of the apparatus.

In order to keep the meshes in the belt 3 from being clogged by resin or other material, a burner 32 is provided for projecting a flame directly against the belt 8 as it travels around the reversing rollers. This is followed by a stiff wire brush 34 which revolves against the belt 8 just below the burner. The flame from the burner 32 partially disintegrates the material which becomes attached to the belt and then, it is knocked off through the action of the brush 34.

The winding sections 2 of my apparatus as just described are enclosed within housings so that they may be effectively heated to relatively high temperatures. The nature of these housings will depend to some extent upon the particular modification of the apparatus. In the form of the apparatus shown in Figure 1, the housing 36 consists of a generally box-shaped unit 38, with one of the upper corners cut away and provided with a trapezoidal extension 40.

At the base of the housing 36, there is located a heater unit 42 which may be of the open-flame, gas type, radiant-gas type, electric, or the like. This heater serves to raise the temperature of the atmosphere within the housing 36 and also heats the belt 8.

The extension 40 on the housing 36 consists of an upper heating chamber 44 and a lower heating chamber 46 which may be heated by means of internal gas burners, electric heaters or the like. This extension serves as a preheating unit for the web 48 of fibre material which is transferred through it to the winding mandrel 22.

In the form of apparatus shown in Figure 3, the housing 36 is generally similar to the form as illustrated in Figure 1, consisting of a rectangular section 38 having a heater unit 42 at the base, but instead of having a section 40 extending from one side, the preheater section 50 in this form of the apparatus is an elongation of the base portion 38 of the housing. As can be seen, the web enters the housing at an opening in the top rather than at the side as in the form illustrated in Figure 1 and is preheated by the hot air rising up the housing into the upper section 50 rather than being preheated by means of radiant heat from the preheater ovens 44 and 46 of the extension 40, as is the case with the type of apparatus shown in Figure 1. The housing 36 in each type of apparatus is provided with a hinged door 52 which provides access to the interior of the housing and permits the mandrel 22 to be inserted or withdrawn from the housing.

The apparatus of Figure 3 is provided with a guide mechanism 54 which can be used to catch the end of fibre webs and lower it into the lamination mandrel 22, with a spring back pressure.

The conveyor units 4 and spray sections 6 are generally similar in all the forms of my apparatus. The primary elements of the conveyor 4 are an endless belt 56 and a plurality of rollers 58 and 60 upon which the belt 56 is carried. The delivery end of the conveyor unit 4 is so positioned that the web 48, which travels off of the delivery end, drops on to the belt 8 and is delivered onto the winding mandrel 22.

At the pickup end of the conveyor 4 there is a group of pinch rollers 62, 64 and 66. The rollers 64 and 66 are rotated together and independently of the rollers 58 and 62 and serve to guide the web 48 as it enters upon the conveyor 4. Furthermore, these sets of rollers serve as means to cut or part the web 48 when a sufficient length of the web 48 has been played out to the mandrel 22 to form a pipe of suitable wall thickness. Thus, it has been found to be very difficult to cut or sever a web of glass fibres by conventional cutting means and I have discovered that it is much more satisfactory to sever the web by means of a set of rollers, as shown, by causing one of the set of rollers, such as 58 and 62, to rotate while the cooperating sets 64 and 66 are stopped. This pulls the web 48 apart with a tapered edge which is very useful in forming the plastic pipe.

Spools 68 and 70 of fibre webs, fabric or the like, are supported upon the holders 72 and 74 which permit the spools 68 and 70 to rotate and supply a continuous web to the conveyor 4. The entire web is made by taking off webs of lesser width from the separate spools 68 and 70 which are staggered so that the feathered edges of the fibre webs may be overlapped to provide a continuous, unbroken web of the required width. In this fashion a continuous supply of web of any width can be obtained.

The spray unit 6 is preferably located toward the pickup end of the conveyor 4 so that there will be a considerable distance of travel of the web after the resin impregnating material has been sprayed upon the web and before the web reaches the winding mandrel 22. This spray unit 6 consists of a spray header 76 located a short distance above the upper surface of the belt 56 and a spray guard 78.

*Operation*

With the general structure of my apparatus described, it is now possible to briefly describe my new method of making pipe.

The operation is begun by threading a web of fibrous material 48 through the rollers 64 and 66 to the rollers 58 and 62. Here, the web is picked up by the travelling belt 56 and conveyed along, in an extended position, beneath the spray unit 6. As the web passes under the spray 6, a liquid containing a material which is capable of polymerizing to an infusible solid is sprayed upon the upper surface of the web. From here, the web travels along the belt 56 toward the delivery end. During this time, the liquid sprayed on the web will flow out along the web and generally impregnate the web, although, even when the web reaches the mandrel, there is generally a higher concentration of the resinous liquid upon the upper surface than upon the lower surface.

As the impregnated web travels up the conveyor to the delivery end, the polymerizable material in the impregnant undergoes a polymerization and this is greatly accelerated as soon as the web enters the preheating units 40 (using apparatus as shown in Figure 1) or 50 (using apparatus of the type shown in Figure 3). The speed of travel of the web and the temperature of preheating is such that the polymerization is 60 to 80% complete by the time the web reaches the winding mandrel. In this respect, the apparatus of the type shown in Figure 1 is preferred because it is possible to more closely control the degree of preheating since the amount of heat applied to the web can be more closely regulated by the ovens 44 and 46 than is the case in the extension 50.

When the web leaves the delivery end of the belt 56, it drops on to the belt 8 and is then forced around the mandrel 22.

The pressure exerted by the belt 8 upon the web as it winds around the mandrel 22 is governed by the force exerted by the roller 10 upon the belt. The speed of rotation of the belt 8, and, in turn, the rate of winding of the web about the mandrel 22, is so controlled in cooperation with the amount of heat applied by the heater 42, that the polymerization of any given portion of the web 48 is substantially completed by the time that the outside portion 80 of the web reaches the point at which this portion comes in contact with the inside of a new layer of web being wound upon the cured web.

As soon as sufficient web has been fed past the rollers 64 and 66, so that when it is finally wound upon the mandrel 22 a pipe of the desired thickness will have been formed, rotation of the rollers 64 and 66 is stopped, while the remainder of the apparatus continues to operate. This causes the web 48 to be parted between the rollers 64 and 66 and the rollers 58 and 62. Then, after the trailing end of the web 48 passes beneath the spray 6, the spray is stopped if it is desired to discontinue operations and the apparatus is run until all the web has been wound around the mandrel and the pipe formed. On the other hand, if it is desired to continue production of pipe, as soon as the web has been severed by the rollers 64 and 66, rotation of these rollers is again started and the operation of spraying, precuring and winding is continued without interruption.

As soon as the trailing end of the web is wound upon the mandrel, the production of the pipe is completed and the mandrel can be withdrawn from the housing 36 by lifting the roller 10 up away from the belt 8, pulling the roller 16 in up position (as shown in dots in Figures 1 and 3), and withdrawing the mandrel with the enclosing tubular section from the housing through the door 52. Immediately, a new mandrel 22 can be placed in the loop 20, the roller 16 returned to the down position, the roller 10 forced down upon the belt 8 and the leading end of a new section of web dropping from the delivery end of the belt 56 inserted between the belt 8 and the mandrel 22, and the production of pipe continued. It is best to coat the mandrels wtih a lubricant before use and to pre-position them over the lamination belt so that they become pre-heated and are ready to enter the winding loop when a finished pipe and mandrel are ejected.

EXAMPLES

The nature of the products produced in accordance with my invention and the procedures involved are further illustrated by the following examples in which parts or percentage are by weight unless otherwise specified.

Example I

A glass fibre blanket 0.018 to 0.036 inch in thickness (such as illustrated in Figure 7 by the section of glass fibre mat 82) is fed from a spool of the fibre blanket and conveyed beneath a spray having a slot of 0.0625 to 0.09375 inch width, where a liquid material having a viscosity of 100 to 600 centipoises of the following composition is sprayed upon the top of the blanket:

10 to 20% liquid melamine-formaldehyde condensation product 5 to 15% very finely ground clay or bentonite 65 to 85% liquid phenol-formaldehyde condensation product.

The spray rate is controlled in coordination with the rate of travel of the web, so that a quantity of liquid polymerizable composition equal about in weight to the weight of the glass fibre blanket is sprayed upon successive portions of the blanket.

The impregnated web travelling at a rate of about 95 to 285 inches a minute is heated, while travelling outstretched along a belt conveyor to a temperature of 200 to 300° F. This preheating of the web is continued for approximately 2 to 5 minutes until the web is dropped into contact with the winding mandrel. As the partly cured web is wound about the mandrel, it is subjected to a pressure of about 50 to 60 p. s. i. due to a continuous belt which presses it in contact with the winding mandrel and it is heated to a temperature of between 200 and 300° F. by the heated atmosphere surrounding the mandrel and also conduction of heat from the hot metal belt.

The rate of feed from the belt conveyor is slightly slower than the rate of travel of the laminating belt and winding mandrel by about ⅛ inch per revolution of the winding mandrel, so that a stretching pressure is created on the fibre web being laminated in order to insure tight winding of the web.

The winding mandrel is 6 inches in diameter and the laminating belt of the mandrel is rotated at a rate of 5 to 15 revolutions per minute.

When seven layers of web have been wound about the mandrel, the mandrel is withdrawn from the cradle in the laminating belt and as soon as the mandrel and the finished pipe have cooled to a sufficient degree to room temperature, the pipe is removed from the mandrel by sliding the mandrel out of the pipe.

The pipe is about ¼ inch in wall thickness, 6 inches I. D., and 20 feet in length. The general appearance of the finished pipe is illustrated in Figure 6 which shows the pipe 84 composed of separate laminations 86 of glass fibre blanket held together by the bonding of infusible resin. Actually, Figure 6 is somewhat exaggerated for the purpose of illustration because in the finished pipe, it is difficult and many times impossible to observe separate layers of glass blanket, since the pipe assumes the appearance of a solid section.

Example II

The procedure of Example I is repeated, using the same glass fibre blanket and the same procedural steps with the substitution of the following liquid polymerizable composition for the equivalent composition used in Example I.

5 to 15% very finely ground clay or bentonite 80 to 95% of a liquid phenol-formaldehyde condensation product.

A pipe which is in all general respects similar to the pipe produced in Example I is obtained, although the actual structural characteristics of the pipe are slightly different.

Example III

A pipe comparable to that produced by the procedure of Example I is made by substituting a liquid melamine-formaldehyde condensation product containing no added solids or other materials for the equivalent material of Example I.

DISCUSSION OF VARIABLES AND MODIFICATIONS

Several variations and modifications of my invention may be employed while still utilizing the novel concept and procedures of the invention.

A modification in apparatus and procedure is illustrated in Figure 4. In this form of apparatus, the pressure for forcing the mat 48 against the winding mandrel 22 is obtained from a series of rollers 88, 90, 92 and 94, rather than from a laminating belt 8, as in the apparatus previously described. In addition, no special preheating chamber is provided with the apparatus so that precuring of the impregnated fibre web having contact with the laminated mandrel 22 is brought about by slow travel of the web at temperatures prevailing in the atmosphere surrounding the conveyor 4.

Apparatus of the variety shown in Figure 4 is not as desirable as the types shown in Figures 1 to 3, both because of lack of control of precuring and because of unevenness of laminating pressure about the winding mandrel.

A still further modification of the pressure applying means for the winding mandrel is shown in Figure 5. As in the other forms of apparatus, previously described, the web 48 is fed to the winding mandrel 22 by the conveyor 4. Pressure is applied by means of the wire-woven belts 96 which are stretched over the rollers 98 carried upon the arms 100. The belts 96 are tensioned to the action of the springs 102 and screws 104. In addition, the springs 106 between the arms 100 also tension the belts 96.

The belts 96 are forced toward the mandrel 22 by the pressure piston 108 to which the arms 100 are pivoted at joints 110 through piston arms 112.

Using the apparatus shown in Figure 5, the production of pipe is carried out by cyclic operation. Thus, the web is first fed to the winding mandrel 22 with the belts 96 drawn back from the mandrel. After a suitable length of web has been wound upon the mandrel, the belts 96 are forced against the web by the pressure pistons 108. After the pressure has been applied for a sufficient length of time, the belts 96 are withdrawn from contact with the web, further web is wound upon the mandrel and the operations of winding and pressing are repeated.

Additional modifications of apparatus can be made. Thus, odd-shaped winding mandrels can be employed so as to produce tubular members of various cross section. Other modifications are possible, such as heat controls on the ovens and heaters, variations in the type of woven belts which are employed, and also the belts for units employed in the conveyor, etc. The belt 8 in the winding section of the apparatus is preferably made of welded, intermesh steel cloth, but any other suitable type of flexible metal belt provided with openings or meshes therethrough which will permit water-vapor or other gaseous fluid to escape from the surface of the winding mandrel 22, may be employed. Similarly, a wide variety of materials can be used for the belt 56 in the conveyor 4, but it has been found preferable to use woven wire cloth of a continuous width; but belts of narrow width, using a plurality of the narrow width belts across the rollers 58 and 60 in order to provide the necessary width to support the fibrous mat or web, may be used.

In addition to modifications of apparatus, various changes can be made in the procedure and materials used. The invention has been described with particular reference to the use of web composed of mats of individual glass fibres. However, it is possible to use substantially any other type of fibrous web which will not be destroyed by the temperature of polymerization. Thus, the term "web" has been employed broadly to include not only fibre mats, but also woven fabrics, or the like which can be made from glass fibres, organic fibres, such as cotton, synthetic fibres, such as rayon, nylon or the like, or inorganic fibres, such as asbestos. Preferably, the web which is used should have a thickness between 0.01 to 0.1 inch and especially between 0.018 to 0.036 inch.

A wide variety of materials which can be polymerized to form infusible resinous solids can be used in the formation of the liquid compositions which are sprayed upon the fibre webs. Liquid condensation products of melamine and formaldehyde or phenol and formaldehyde which can be heat-cured to an infusible state have been found to be particularly useful. However, other materials, such as heat-convertible alkyd resins, monomers or partial polymers of materials containing a plurality of vinyl, allyl, acrylic, methacrylic or similar reactive unsaturated groups which polymerize to form infusible solids may be used, e. g., diallyl phthalate, glycol dimethacrylate or the like. In addition, the mixtures of these compounds with themselves or with additional modifying materials, such as fillers, e. g., clay or bentonite, dyes, pigments, catalysts or the like, may be used. The final composition which is used by impregnating the fibre mats should be liquid with viscosity of 10 to 1000 centipoises and, preferably, with a viscosity of 50 to 600 centipoises. If solid fillers or similar materials are included in the liquid bonding materials, they should be preferably kept under 20% by weight of the total composition, but it is possible to make satisfactory products without the use of any such solid fillers.

The amount of resinous bonding materials which is used in the formation of the pipes may be varied and will depend, to some extent, upon the particular material which is employed for this purpose and also upon the particular fibre from which the webs are made and, further, upon the properties which are desired in the final pipe or other tubular members. However, under most conditions, it has been found desirable to operate the process so that the final pipe has a total resin content of between 30 and 60% by weight, the balance being fibre or other solid filler material.

Various conditions of temperature, pressure and time used in the process may be varied and will depend, to a large extent, upon the particular polymerizable material which is used as the bonding agent. However, for most cases, a pressure of 10 to 100 p. s. i. for forcing the webs against one another during the lamination on the winding mandrel and a curing temperature of between 200 and 300° F. have been found preferable. As far as the precuring of the impregnating web is concerned, this is preferably carried out so that the polymerization of the resinous material with which the web is impregnated is 60 to 80% complete before the precuring web reaches the winding mandrel. Accordingly, the time of cure and the rate of travel of the web will be governed by this factor and also the temperatures which are used in the precuring and in the final curing operations. Under most general operations, the normal length of time for the formation of a given section of pipe and the precuring of any given portion of impregnating web required for that section of pipe will vary between ½ to 5 minutes, although, as can be realized, this will depend upon the size of the pipe being used and also the length of the precuring chamber.

The degree of ultimate polymerization or curing of the resin binder may be varied to some extent. As has been indicated, the curing of the resin should be between 60 to 80% complete before reaching the mandrel and should be substantially complete before the new layer is overlapped upon the formed layer. It should be pointed out that the term "substantially cured," as used herein, means that the polymerizable material has been converted to a solid material which is insoluble and infusible. It will be understood that even when the material has been polymerized this far that with further vigorous polymerization conditions it is possible, in some cases, to carry the degree of polymerization still further. This fact may be used to advantage in some cases, using my new methods, by passing the pipe, after removal from the mandrel, through an after-curing oven, where the pipe is subjected to further heating. In some cases, such as where phenolic resins are used as the binder, this procedure can be used to further increase the strength properties of the pipe, although it has no effect upon the shape or rigidity of the pipe.

CONCLUSION

Using the procedures and apparatus which have been illustrated and described herein, it is possible to produce pipes of fibre webs laminated together by resinous bonding material at a relatively very high rate of production. Not only can the pipe be made rapidly, but the resulting pipe is characterized by a very high degree of uniformity in structural properties throughout all sections of a particular length of pipe and also consistency in properties between separate lengths of pipe. The new tubular members provided by these new procedures are also characterized by a high degree of corrosion resistance and a relatively very high weight-strength ratio. The products are fire-resistant and impervious to most common varieties of liquid and chemicals, although some very corrosive chemicals will corrode the pipe.

These pipe or tubular members may be employed in any application for which such general types of products are known to be useful. Examples of possible applications are for oil well casings, conduction of liquids highly corrosive to ordinary steel or iron pipe as structural supports or construction members where light weight with good strength is important or in many other types of applications.

This application is a continuation-in-part of application Serial No. 15,957, filed March 19, 1948, now abandoned.

I claim:

1. A process for the production of tubular members composed of plastic-bonded laminations of fibrous material which comprises impregnating a continuous length of fibre web with a liquid thermosetting material capable of polymerizing to an infusible solid, partially curing the thermosetting material in the impregnated web while the impregnated web is outstretched whereby a tacky surface is formed upon the web, winding a section of the partially cured web into a tubular shape one layer in thickness, substantially completely curing the thermosetting material in the single layer of tubular-shaped web, wrapping a second layer of the same partially cured web about the first completely cured layer, substantially completely curing the thermosetting material in said second layer, and repeating said cycles of web wrapping and curing until a tubular member having walls of the desired thickness has been formed.

2. A process for producing corrosion-resistant pipe of plastic-bonded, laminated fibrous material which comprises conveying in continuous length a distended web of glass-fibres toward a winding mandrel, spraying a liquid, thermosetting material, capable of polymerizing to an infusible, resinous solid, upon the upper surface of the web, subjecting the sprayed web to heat to cause a partial polymerization of the thermosetting material to take place before any given portion of the web reaches said mandrel, winding the so-treated web about the mandrel, subjecting the wound web to heat to complete the conversion of said thermosetting material to the infusible state, and winding further of said treated web upon the outside of the cured layer, the winding of the successive layers of partially cured web about the mandrel being conducted at such a rate that the portion of the web already upon the mandrel which comes in contact with the corresponding portion of the new layer has its resin content substantially completely cured.

3. In a process for producing non-metallic pipe of laminated fibre webs by winding a continuous web of fibrous material impregnated with a resinous condensation product capable of being thermoset to an infusible state upon itself about a mandrel, the steps which comprise partially curing the successive portions of the impregnated web before they wind upon the mandrel and then completing the curing of the successive portions of the impregnated web after they have been wound upon the mandrel and before they are wrapped with a new layer consisting of a further portion of the impregnated, partially cured web.

4. A process for making non-metallic, laminated pipe which comprises rotating a mandrel in a confined space, heating the atmosphere in said confined space surrounding said mandrel to an elevated temperature, passing a web of fibrous material onto a conveyor which supports the web in outstretched position, conveying the web upon the conveyor toward said mandrel, impregnating the web with a heat-convertible liquid resin by spraying the resin from above down upon the top surface of said web as it moves toward the mandrel, heating the impregnated web before it reaches the mandrel to bring about a partial curing of the thermosetting impregnant before the web reaches the mandrel, and winding the partially cured web about the mandrel at such a speed that the heated atmosphere within said confined space causes the web-impregnant to become substantially thermoset to the infusible state by the time the web upon the mandrel has advanced to the point where it comes in contact with the new section of web, and continuing said winding and curing until a pipe of desired thickness has been formed.

5. A process as claimed in claim 4 wherein said heating of the impregnated web prior to reaching the mandrel is accomplished by passing the outstretched, impregnated web through said confined space for a substantial distance before the web reaches the mandrel.

6. A process as claimed in claim 5 wherein said heating of the impregnated web prior to reaching the mandrel is accomplished by passing the outstretched, impregnated web through a space where the sheet is subjected to radiant heat before the web enters the confined space enclosing said mandrel.

7. A process for making non-metallic pipe comprising spraying a liquid thermosetting resinous material capable of polymerizing to an infusible solid upon the upper surface of a non-woven continuous web of stable glass fibres while the web is supported in outstretched condition forming a wet glass fibre web which must be supported from beneath to prevent destruction, partially curing the thermosetting material in the impregnated web while said web is outstretched whereby a tacky surface is formed thereon while supporting the web from beneath, transferring a section of the partially cured web to a winding mandrel without applying any substantial drawing force upon the web, winding the partially cured web about said mandrel, substantially completely curing the thermosetting material in the single wound layer of the web, wrapping a further portion of the partially cured web about said first layer to form a second layer thereon, substantially completely curing the thermosetting material in said second layer, repeating said cycles of web wrapping and curing to form a laminated pipe of substantial thickness and withdrawing resulting section of laminated pipe from the mandrel.

8. In a process for the manufacture of nonmetallic pipe comprising glass fibre mat reinforcing infusible plastic, the steps which comprise impregnating a glass fibre mat in continuous length with a liquid thermosetting resinous material capable of polymerizing to an infusible state by spraying said liquid upon one surface of said mat, partially curing said impregnated liquid material while said web is in outstretched condition, winding the resulting web about a free-floating mandrel by passing the web between the mandrel and a surrounding driven enveloping belt to form a single layer of web upon said mandrel, substantially completely curing said wound web layer, thereafter winding a further layer of said partially cured web upon said mandrel, completely curing said second web layer and repeating said operations until a pipe of desired thickness is formed.

9. A process for the manufacture of nonmetallic pipe having a substantially continuous matrix of thermoset plastic material reinforced with a spirally wound continuous mat of glass-fibres which comprises passing a glass-fibre mat from a source of supply toward a mandrel winding station as a continuous length in outstretched position, along the way of said passage spraying heat-convertible liquid resin upon the upper surface of said mat to impregnate the same by having said liquid run from the surface of the mat down into it, subjecting said impregnated mat before it reaches said mandrel station to cause a partial curing of the liquid resin, passing said partially cured web between said mandrel and an enveloping driven belt whereby said mat is caused to wrap around said mandrel without structure injury to said mat, heating said wound mat layer upon said mandrel to cause substantially complete curing of the resin impregnant, winding further portions of the partially cured mat onto said cured layer at such a speed that the previous layers have become substantially completely cured before contact of the new layer therewith, and continuing said winding and curing until a pipe of desired thickness has been formed.

References Cited in the file of this patent

UNITED STATES PATENTS

| Number | Name | Date |
|---|---|---|
| 966,460 | Meirowsky | Aug. 9, 1910 |
| 1,392,535 | Stevenson | Oct. 4, 1921 |
| 1,790,909 | Frostad | Feb. 3, 1931 |
| 1,921,516 | Frederick | Aug. 8, 1933 |
| 2,081,060 | Modigliani | May 18, 1937 |
| 2,131,024 | Cordts | Sept. 27, 1938 |
| 2,383,849 | Davies | Aug. 28, 1945 |
| 2,390,171 | Ratay | Dec. 4, 1945 |
| 2,402,038 | Goldman et al. | June 11, 1946 |
| 2,414,125 | Rheinfrank, Jr. | Jan. 14, 1947 |
| 2,467,999 | Stephens | Apr. 19, 1949 |